Oct. 13, 1931.                A. HOLZ                    1,826,785
PROCESS OF PRODUCING FERTILIZERS
Filed Nov. 28, 1927
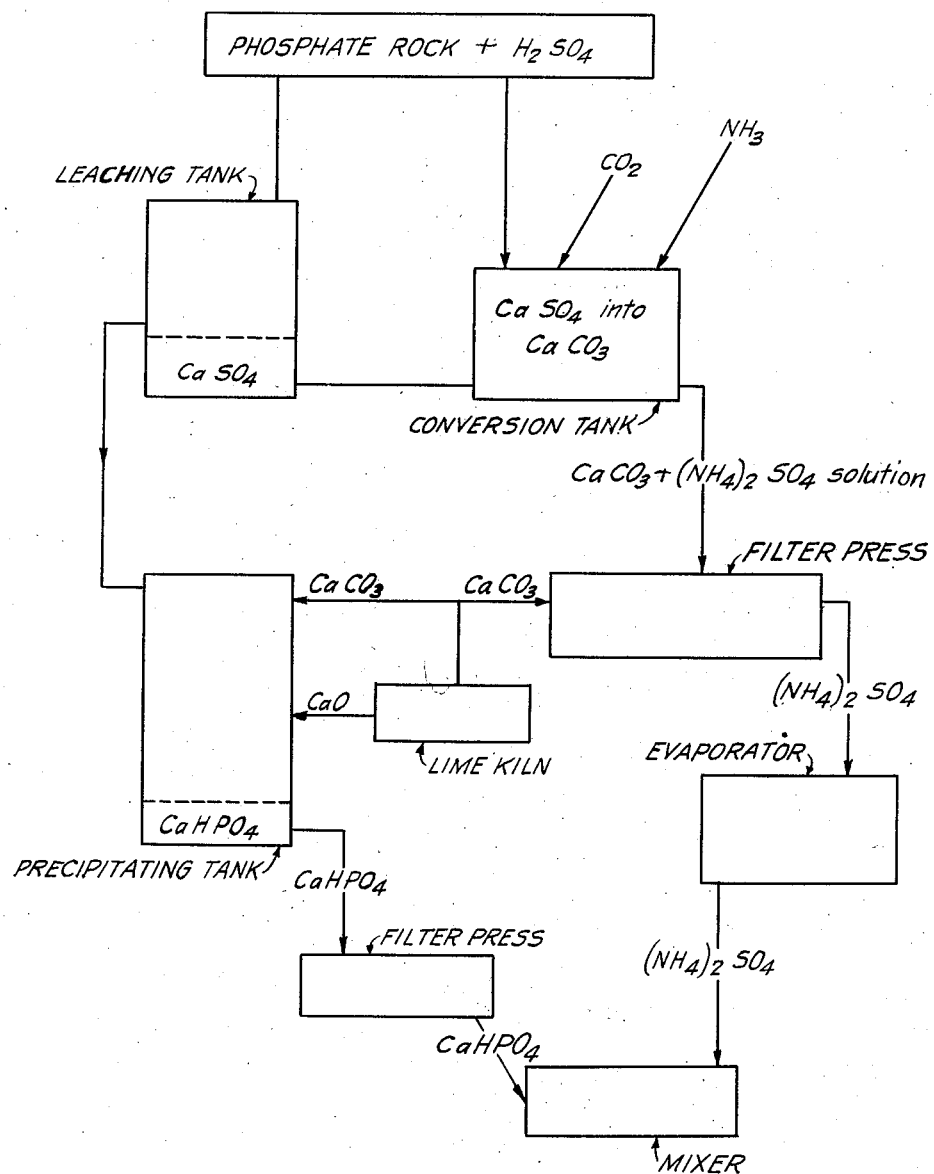
INVENTOR
August Holz
BY
Fredk C. Fischer
ATTORNEY Patented Oct. 13, 1931

1,826,785

UNITED STATES PATENT OFFICE

AUGUST HOLZ, OF IRVINGTON, NEW JERSEY, ASSIGNOR TO THEODORE V. D. BERDELL, OF NEW YORK, N. Y.

PROCESS OF PRODUCING FERTILIZERS

Application filed November 28, 1927. Serial No. 236,369.

This invention relates more particularly to a process for the commercial production of a chemical fertilizer containing a plurality of desirable components and is illustrated diagrammatically by the accompanying flow sheet.

The predominating constituent of the usual chemical fertilizer is phosphoric acid, the percentage of which, in American fertilizers, is usually equal to the sum of two other components, namely, ammonia and potash. The source of this phosphoric acid is primarily the natural rock phosphates, large deposits of which occur in Florida, Tennessee and some of the Western States. Although these rock phosphates contain a high percentage of phosphoric acid they are of little or no value as fertilizers as their phosphoric acid is combined with calcium in the form of tri-calcium phosphate, a compound insoluble in water and in the soil solutions and, therefore, not available for absorption by the plant. The crude rock phosphorate is, therefore, subjected to a chemical treatment in order to decompose it and make the phosphoric acid available for assimilation by the plant. In the ordinary commercial process this decomposition is effected by treatment with sulphuric acid, resulting in a mixture of calcium sulphate, an insoluble compound, and mono-calcium phosphate which is highly soluble in water.

This production of calcium sulphate and its retention in the mixture, constitutes a serious drawback in the operation of this prior process, since about an equal weight of sulphuric acid is required for the decomposition of a given quantity of rock phosphate, thus, roughly, doubling the original weight. It is obvious that any process which would release the sulphuric acid of this inert, insoluble compound of calcium sulphate for combination with other and more desirable ingredients of a commercial fertilizer, such as ammonia or potash, would constitute an important and novel improvement in the art. I have discovered such a process and, in order that my improved process may be more clearly understood and distinguished from the prior art, my process will be described in such terms that it can be carried out by anyone familiar with the art.

In addition to the natural tri-calcium phosphate and the mono-calcium phosphate, above referred to, calcium forms a third compound with phosphoric acid known as di-calcium phosphate, $CaHPO_4$, which, although insoluble in water, is soluble in the soil solutions and, as proven by experiment as fully equal to mono-calcium phosphate as a fertilizer. In fact, owing to its neutral character, it is, in the long run, superior to mono-calcium phosphate which has a very strong acid reaction. If finely divided or powdered natural rock phosphate, essentially $Ca_3P_2O_8$, is decomposed by the addition of three molecules of sulphuric acid, calcium sulphate and free phosphoric acid are formed according to the equation

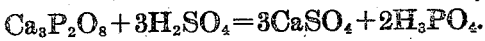
$$Ca_3P_2O_8 + 3H_2SO_4 = 3CaSO_4 + 2H_3PO_4.$$

The mother liquor containing free phosphoric acid is then removed from the insoluble calcium sulphate, by decantation, and the latter washed once with water. This wash-water is preferably saved, as it can be used again in the treatment of subsequent batches of rock. The precipitated calcium sulphate is in a very fine state of division and therefore extremely reactive. If the moist precipitate (calcium sulphate) is now treated with ammonium carbonate or preferably ammonia and carbon dioxide, it is easily transformed into insoluble calcium carbonate, while the ammonia combines with the sulphuric acid radical to form ammonium sulphate, the reaction being facilitated by a slight increase of pressure and temperature. Calcium carbonate being about 200 times more insoluble than the sulphate the reaction is almost quantitative even under ordinary conditions. The mother liquor of this last reaction, containing ammonium sulphate, is then removed, by filtration, and concentrated for further treatment. One third of the moist precipitated calcium carbonate and an equivalent amount of calcium hydroxide are now added to the mother liquor containing the free phosphoric acid. Carbon dioxide is evolved, by the action of the phosphoric acid on the calcium carbonate, which is collected and may be used over again for the production of ammonium carbonate, as explained above, while the calcium combines with the phosphoric acid to form insoluble di-calcium phosphate.

Di-calcium phosphate, as previously explained, is a very insoluble compound and the filtered solutions are so barren that they may be discarded entirely. The precipitated di-calcium phosphate, however, is added to the concentrated mother liquor solution of ammonium sulphate and the whole mass evaporated to complete dryness, and the residue coarsely powdered to obtain a granular product.

As an example of the quantities of materials used in preparing my fertilizer, for a ton of rock phosphate the composition of which is approximately 32% $P_2O_5$ and 48% $CaO_1$, 1.5% $Fe_2O_3$ and 1.25% $Al_2O_3$. About 1800 pounds $H_2SO_4$ is required for complete decomposition. To convert the produced calcium sulphate into calcium carbonate, it is treated with about 760 pounds $CO_2$ in the presence of about 630 pounds $NH_3$ under a pressure not exceeding two atmospheres and a temperature not exceeding 100 degrees C. To precipitate the 640 pounds $P_2O_5$ in solution requires approximately 900 pounds calcium carbonate or about 500 pounds of calcium oxide converted into calcium hydroxide. This will yield approximately 1550 pounds di-calcium phosphate soluble in ammonium citrate.

Instead of ammonium carbonate, as described above, potassium carbonate may be used for the conversion of calcium sulphate into calcium carbonate, since potassium, especially in the form of sulphate is a very desirable constitutent of a fertilizer. The solution of potassium sulphate resulting from this reaction is treated in the same manner as the ammonium sulphate solution above referred to. Naturally I may also use a mixture of both compounds, ammonium carbonate and potassium carbonate, or the hydroxides thereof, in the presence of carbon dioxide, in any desired proportion, provided their total quantity is sufficient to effect the complete transformation of calcium sulphate into calcium carbonate. From the above description it is apparent that by my process the conversion of the inert, and heretofore useless, calcium sulphate into valuable fertilizer ingredients can be accomplished in a commercially feasible manner.

I am well aware that recent investigators have assigned a different formula to the calcium phosphate of natural rock phosphate, than the one used in describing my process. It will be understood, however, that the slightly different ratio of acid called for by these discoveries does not in any way change the spirit of my invention, nor do I wish to be limited to specific compounds or steps in the process except within the scope of the claim.

I claim:—

The process of preparing a chemical fertilizer which comprises treating finely powdered rock phosphate with sufficient sulphuric acid to decompose the phosphates and form calcium sulphate in a mother liquor containing phosphoric acid, separating the calcium sulphate from the mother liquor, treating the calcium sulphate with ammonium carbonate, preferably as ammonia in the presence of carbon dioxide, under pressure not exceeding two atmospheres and heat not exceeding 100 degrees C., to convert the calcium sulphate into calcium carbonate, removing the liquor containing ammonium sulphate and concentrating it, adding to the mother liquor containing phosphoric acid sufficient calcium in the form of carbonate and hydroxide to form di-calcium phosphate, removing therefrom the liquor, then adding the precipitated di-calcium phosphate to the concentrated ammonium sulphate solution and evaporating the mass to complete dryness.

This specification signed and witnessed this 25th day of November, 1927.

AUGUST HOLZ.